United States Patent
Li et al.

(10) Patent No.: US 10,053,110 B2
(45) Date of Patent: Aug. 21, 2018

(54) SYSTEMS AND METHODOLOGIES FOR CONTROLLING AN AUTONOMOUS VEHICLE

(71) Applicant: TOYOTA MOTOR ENGINEERING & MANUFACTURING NORTH AMERICA, INC., Erlanger, KY (US)

(72) Inventors: Yi Li, Ann Arbor, MI (US); Miles J. Johnson, Ann Arbor, MI (US); Kristofer D. Kusano, Ann Arbor, MI (US); Danil V. Prokhorov, Canton, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 160 days.

(21) Appl. No.: 15/148,556

(22) Filed: May 6, 2016

(65) Prior Publication Data
US 2017/0320501 A1 Nov. 9, 2017

(51) Int. Cl.
*B60W 50/08* (2012.01)
*G05D 1/02* (2006.01)
*G06F 3/0488* (2013.01)

(52) U.S. Cl.
CPC ......... *B60W 50/08* (2013.01); *G06F 3/04883* (2013.01)

(58) Field of Classification Search
CPC ........ B60W 50/08; G05D 1/02; G06F 3/0484; G06F 3/0488
See application file for complete search history.

(56) References Cited

U.S. PATENT DOCUMENTS

| | | | |
|---|---|---|---|
| 8,374,743 B2 | 2/2013 | Salinger | |
| 8,768,539 B1 | 7/2014 | Clement et al. | |
| 8,924,150 B2 | 12/2014 | Tsimhoni et al. | |
| 8,942,881 B2* | 1/2015 | Hobbs | B60K 37/06 701/1 |
| 9,016,168 B2 | 4/2015 | Prokhorov | |
| 9,165,468 B2 | 10/2015 | Luo et al. | |
| 9,182,759 B2 | 11/2015 | Wimmer et al. | |
| 2009/0095547 A1* | 4/2009 | Swett | B60K 1/00 180/65.1 |
| 2009/0230730 A1* | 9/2009 | Ohtsubo | B60N 2/0232 296/193.07 |
| 2012/0271500 A1* | 10/2012 | Tsimhoni | B62D 1/28 701/23 |
| 2014/0055388 A1* | 2/2014 | Yook | G06F 3/0416 345/173 |

(Continued)

*Primary Examiner* — Yonel Beaulieu
*Assistant Examiner* — Martin A Weeks
(74) *Attorney, Agent, or Firm* — Oblon, McClelland, Maier & Neustadt, L.L.P.

(57) ABSTRACT

A system and associated methodology that controls a vehicle component as a function of a user input. The system stores a plurality of functions associated with a plurality of touching gestures, receives the user input, determines, based on the user input, a user gesture wherein the user gesture corresponds to one of the plurality of touching gestures, determines a function associated with the user gesture, determines a feature of the user gesture, determines an operational parameter of the function based on the feature. Then, the system controls the vehicle component associated with the function as a function of the operational parameter.

22 Claims, 13 Drawing Sheets

(56) References Cited

U.S. PATENT DOCUMENTS

2016/0039429 A1* 2/2016 Abou-Nasr ............ B60W 50/10
                                                382/103
2016/0154479 A1* 6/2016 Lee ....................... G06F 3/0362
                                                345/173

* cited by examiner

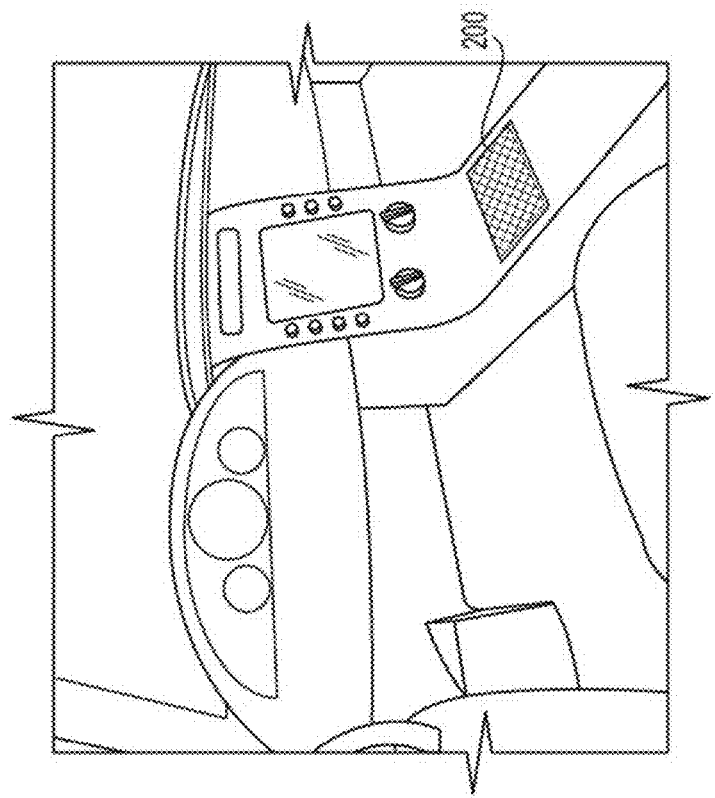
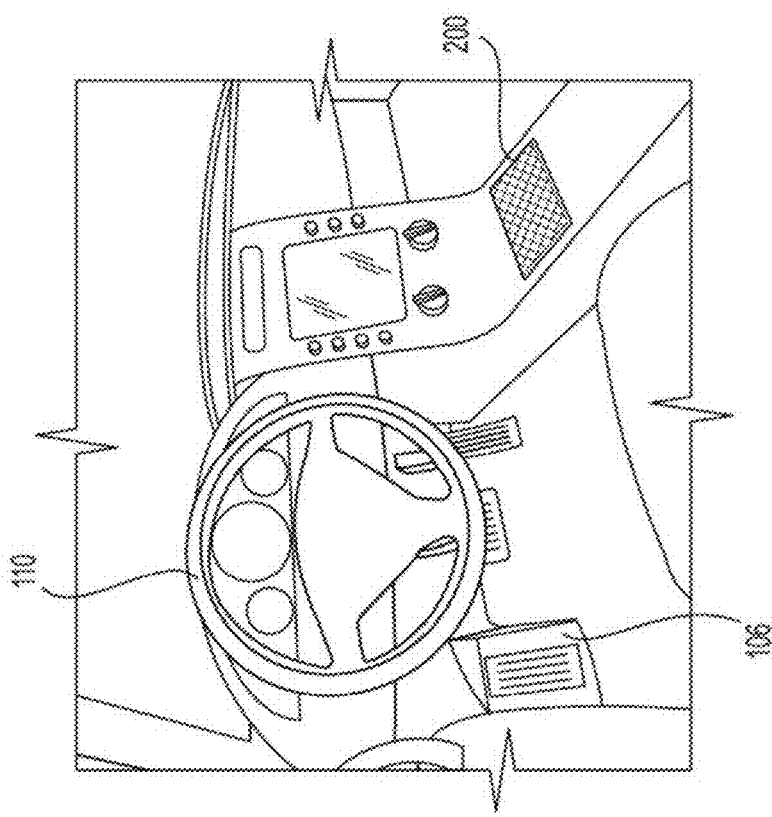
FIG. 9A
FIG. 9B

SYSTEMS AND METHODOLOGIES FOR CONTROLLING AN AUTONOMOUS VEHICLE

BACKGROUND

Autonomous driving systems such as self-driving or highly automated vehicles are designed to operate a vehicle on roads without driver interaction or other external control. As autonomous driving systems become more prevalent, it is necessary to provide a way for a driver to supervise and make minor alterations to the autonomous driving system's planned action, as the driver sees fit. U.S. Pat. No. 9,182,759 B2 entitled "Device for the automated driving of a motor vehicle, motor vehicle having such a device and method for operating a motor vehicle" by Wimmer et al. describes a user interface to control a vehicle.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

The present disclosure relates to a method that stores a plurality of functions associated with a plurality of gestures; receives a user input; determines, using processing circuitry and based on the user input, a user gesture wherein the user gesture corresponds to one of the plurality of gestures; determines, using the processing circuitry, a function associated with the user gesture; determines, using the processing circuitry, a feature of the user gesture; determines, using the processing circuitry, an operational parameter of the function based on the feature; and controls a vehicle component associated with the function as a function of the operational parameter.

The foregoing general description and exemplary implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9A is a schematic of a vehicle front console according to one example;

FIG. 9B is a schematic of the vehicle front console according to one example;

DETAILED DESCRIPTION

Figure 1:
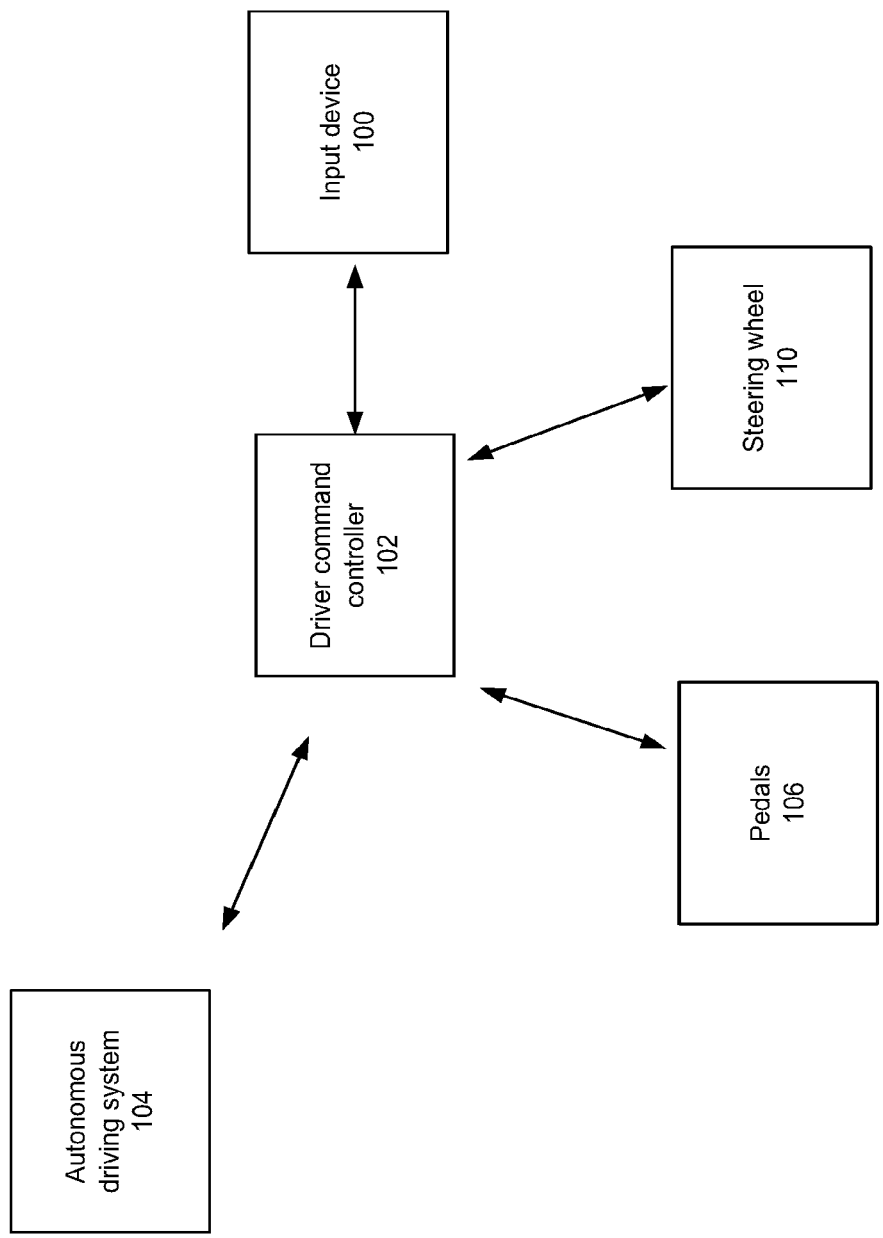
FIG. 1 is a schematic representation of a system for controlling an autonomous vehicle according to one example.

Referring now to the drawings, wherein like reference numerals designate identical or corresponding parts throughout several views, the following description relates to a system and associated methodology for an interface between a vehicle driver and an autonomous vehicle system. The interface permits supervisory control of the autonomous vehicle. The autonomous vehicle may have a predefined path when the vehicle is operating in fully autonomous mode.

Further, as used herein, the words "a", "an" and the like generally carry a meaning of "one or more," unless stated otherwise. Furthermore, the terms "approximately," "about," and similar terms generally refer to ranges that include the identified value within a margin of 20%, 10%, or preferably 5%, and any values therebetween.

The system and associated methodology described herein provide a way of allowing a driver to input minor alterations to the predefined path using an input device. The driver may want to retain the convenience of being safely transported in a vehicle that steers, accelerates, and brakes automatically, while still being able to influence the driving if desired (e.g., lane change to a preferred lane of travel). The vehicle may be a car, a train, a ship, a locomotive, a truck, a bus, or any other vehicle with autonomous navigational capabilities.

Further, the system described herein may control the position of the steering wheel and pedals of the vehicle. For example, the pedals and the steering wheels may be moved from a visible position to a hidden position. The system may use gesture control to control a plurality of functions of the vehicle including minor overrides.

FIG. 1 is a schematic representation of a vehicle system according to one example. The vehicle system includes an input device 100, a driver command controller 102, and an autonomous driving system 104.

The driver command controller 102 receives a user input from the input device 100 and sends control signals to the autonomous driving system 104. The autonomous driving system 104 is configured to receive the control signal, to interpret the control signal, and in response to the control signal, to alter the speed, course, or other dynamic condition of the vehicle in a manner that corresponds with the control signal. The control signal contains information that is indicative of the driver input. For example, when the driver command controller 102 detects a swipe gesture across a touch sensitive surface of the user input device 100 in a leftward direction by the driver, the driver command controller 102 sends a control signal indicating a leftward adjustment of the position of the vehicle within a traffic lane to the autonomous driving system 104.

Communication between devices of the vehicle (e.g., brakes, steering wheel), the autonomous driving system 104, the input device 100, and the driver command controller 102 may be achieved by wire and/or wirelessly.

Figure 10:
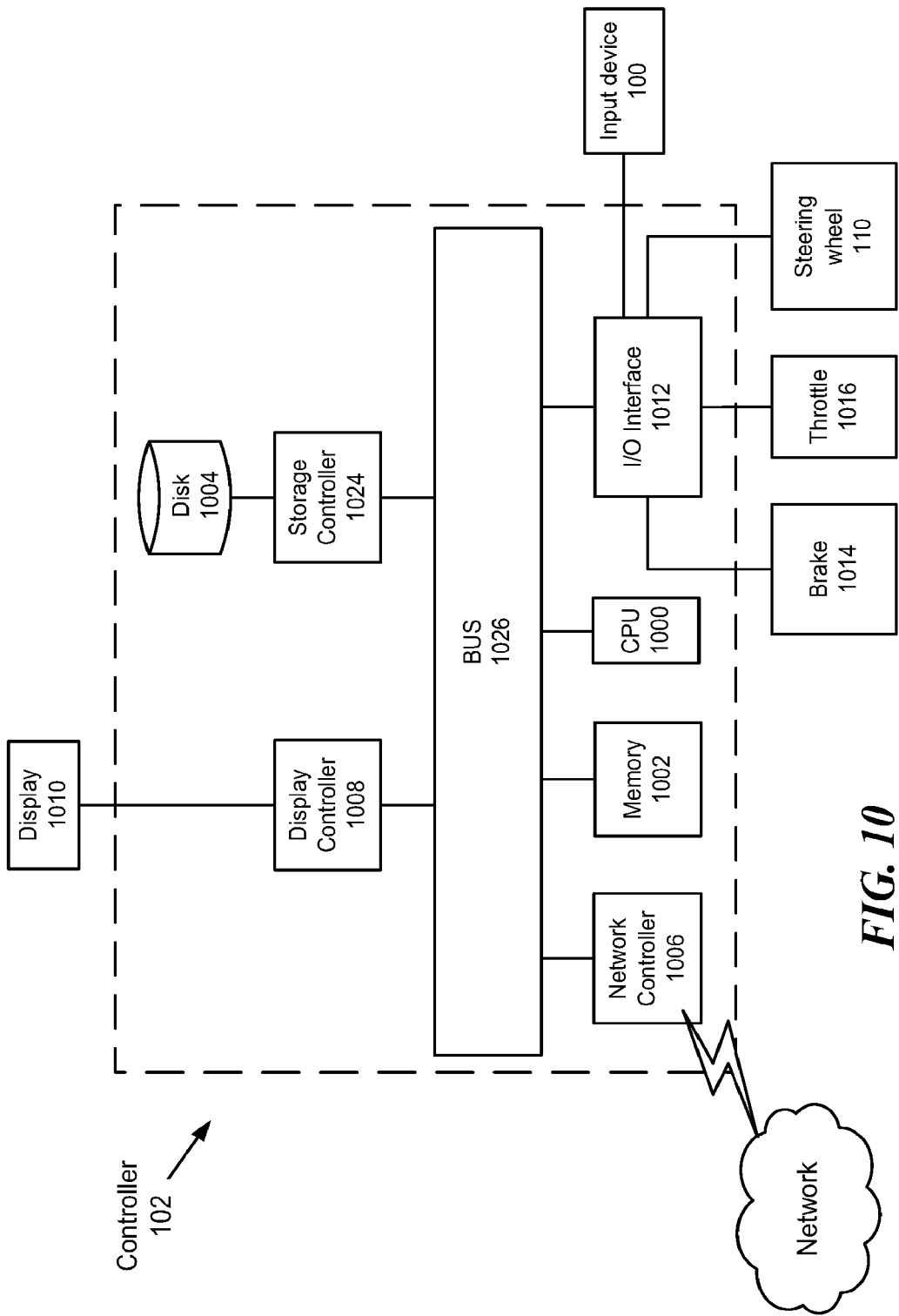
FIG. 10 is an exemplary block diagram of a controller according to one example.

The driver command controller 102 and the autonomous driving system 104 described herein may be implemented in either software and/or hardware modules and may be stored in any type of computer-readable medium or other computer storage device. For example, the driver command controller 102 may be implemented in circuitry that is programmable (e.g. microprocessor-based circuits) or dedicated circuits such as application specific integrated circuits (ASICS) or field programmable gate arrays (FPGAS). In one embodiment, the driver command controller 102 includes a CPU 1000 and a memory 1002, as shown in FIG. 10.

The user input may correspond to one of a plurality of gestures stored in the memory 1002. The plurality of gestures may include touching gestures. Each gesture is associated with a function of controlling a vehicle component. In addition, one or more operational parameters may be associated with each function. For example, for the acceleration function of the vehicle the operational parameter is the acceleration rate. For each gesture detected by the input device 100, the controller 102 may determine one or more features associated with the gesture. For example, when the gesture is a swipe gesture, the features may include a swiping speed, a swiping length, a swiping direction, and the like.

The autonomous driving system 104 includes processing circuitry, which controls an engine, the steering system (e.g. steering wheel), and the brakes. The autonomous driving system 104 may also include cameras, radars, and sensors by which the surroundings of the vehicle are observed.

The input device 100 may be a touchpad, a roller, a joystick, a touchscreen display, a trackball, a voice recognition system, a camera, or any other type of device that is configured to receive and/or detect driver inputs and that is configured to generate a signal corresponding with the driver input when driver input is received/detected by the input device 100.

The input device 100 may be integrated into any suitable surface within the vehicle. In an embodiment, the input device 100 may be a standalone handheld device. In addition, the input device 100 may display information to the driver.

Figure 2:
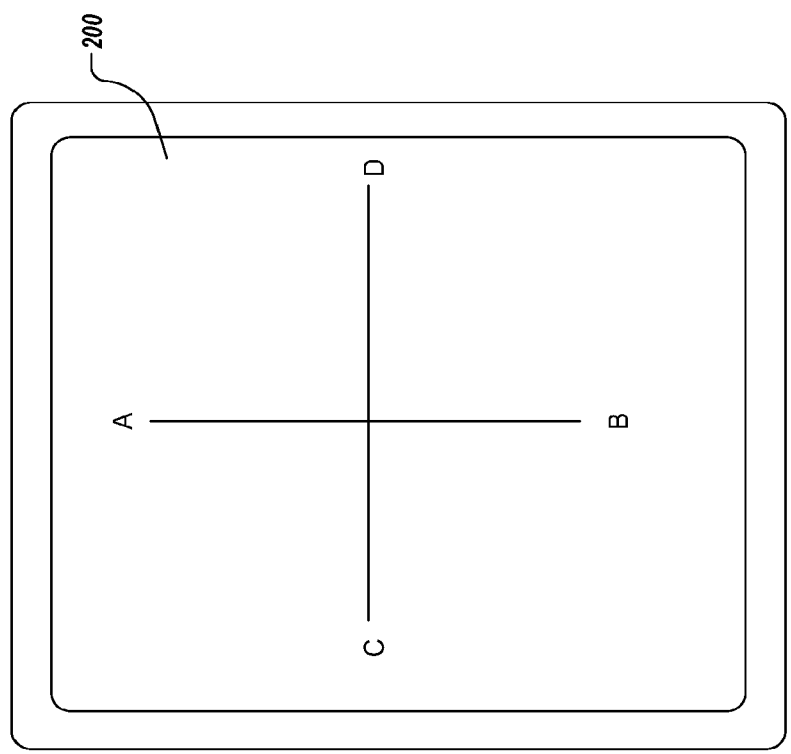
FIG. 2 is a schematic of a touchpad input device according to one example.

FIG. 2 is a schematic of the input device 100 according to one example. The input device 100 may be a touchpad input device 200 including a touch sensitive surface or a display overlaid with the touch sensitive surface such as a multi-touch input surface (MTIS). Multiple technologies exist for detecting a user's touch using a touch sensitive surface including capacitive technologies, resistive technologies, optical technologies, wave technologies, or other technologies as would be understood by one of ordinary skill in the art. In one example, the touchpad input device 200 size may range between 4 to 10 inches.

For example, the display may be similar in appearance to display screens with conventional tablet computers. The display may be a liquid crystal display using fluorescent or light emitting diode (LED) back lighting, an LED display, or other flat panel display as would be understood by one of ordinary skill in the art. The display may be of different sizes.

In one embodiment, the MTIS based on resistive technology may include a flexible plastic front sheet and hardboard coated with a thin resistive film. The resistive sides of each are separated by an air gap of two-thousandths of an inch. Pressure applied to the surface of the front sheet closes the gap and is registered as a contact point. This contact point is then converted from an analog signal to a serial data stream which is processed by the CPU 1000. The driver may use a finger, pen tool, or any device.

In one embodiment, the MTIS may be based on capacitive technology. The capacitive technology may be based on mutual capacitance where the object such as a user's finger or a stylus pen alters the mutual coupling between row and column electrodes, which are scanned sequentially. The row and column electrodes are obtained by etching a conductive layer. In other embodiments, the capacitive technology may be based on self capacitance where the object loads the sensor or increases the parasitic capacitance to ground.

The touchpad input device 200 can detect a plurality of user gestures such as swiping, tapping, pinching, and the like. Each of the plurality of gestures is associated with the control of a vehicle component. For example, a vertical swipe may be associated with the pedals of the vehicle. A horizontal swipe may be associated with the operation of the steering wheel of the vehicle.

In an embodiment, a swipe to the left can indicate a left turn or a lane change to the left and a swipe to the right can indicate a right turn or a lane change to the right. For example, a swipe from point C to point D on the touchpad 200 as shown in FIG. 2 may indicate a right turn. A swipe from point A to B may indicate a change in vehicle speed (e.g., acceleration, deceleration).

As described previously herein, a change in the speed may be determined by the swipe feature of the touchpad. In one example, swiping the touchpad in a quick fashion indicates for the vehicle to accelerate while swiping in a slow fashion indicates to the vehicle to slow down. In one example, a fast swipe in the forward direction on the touchpad increases the set speed by a large amount (e.g., 5 to 10 mph), whereas a slow swipe in the forward direction increases the vehicle set speed by a small amount (e.g., 1 to 5 mph). Swipes in the backward direction lower the vehicle set peed. The user controls the set speed and the autonomous vehicle determines the acceleration and deceleration profile to comfortably maintain that set speed. Each swiping speed may be associated with an a set speed. The driver command controller 102 may determine a swiping speed. Then, the driver command controller 102 may use a look up table to match the determined swiping speed with a set speed.

In one example, in response to determining that the swiping speed is greater than a predetermined value, the set speed may be changed to a predetermined set speed. In one example, when the swiping speed is within a predetermined range, the set speed is increased by a predetermined amount. The predetermined amount may be set by the driver or by a third party such as the vehicle manufacturer.

The swiping speed may be calculated by determining the distance between successive touches in the swipe motion and determining the elapsed time between the touches.

In one embodiment, the rate of acceleration or deceleration may also be a function of the frequency of the swipes of the user. A higher swiping frequency may indicate a higher acceleration rate.

Figure 3:
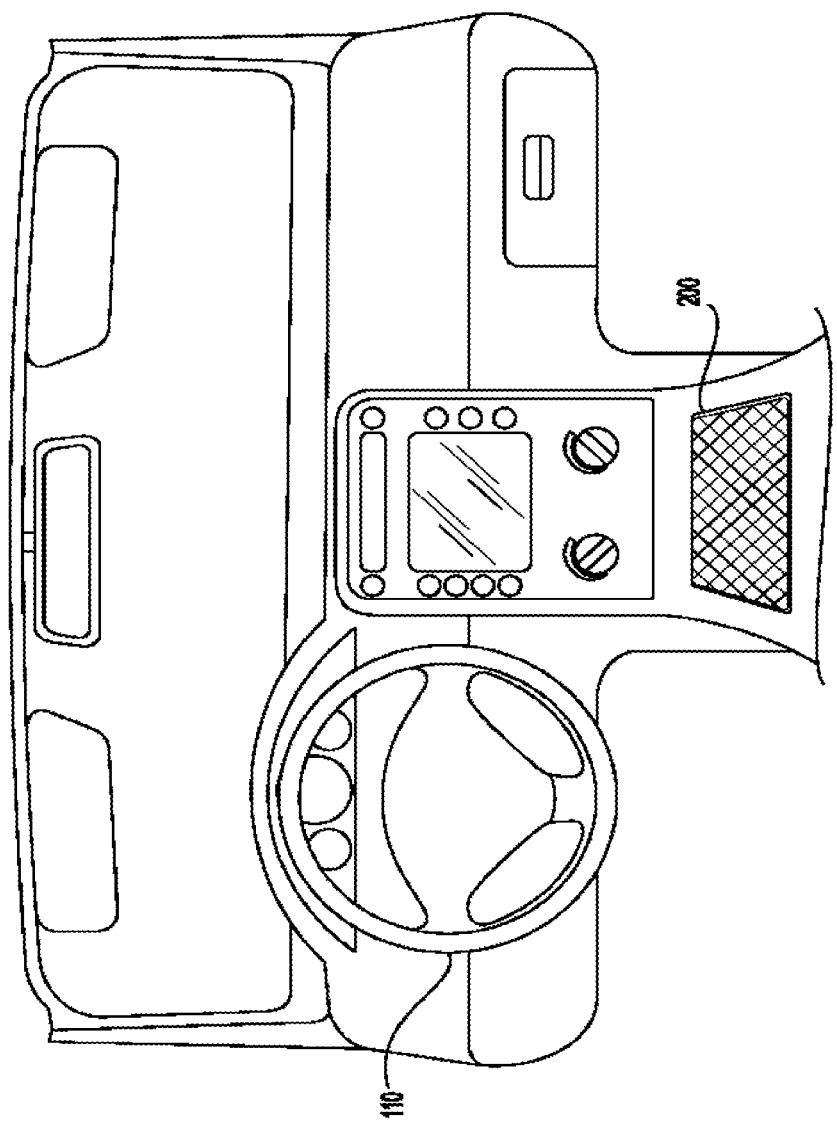
FIG. 3 is a schematic of the center console of the autonomous vehicle with the touchpad input device according to one example.

FIG. 3 is a schematic that shows the center console of the vehicle with the touchpad input device 200 according to one example. The touchpad input device 200 may be movable in the x-y plane in a conventional rectilinear geometry. In addition, the input device may be movable in the z-direction, perpendicular to the x-y device. That is, the user may adjust the position of the touchpad input device 200 to a preferred position for easy input while driving.

As mentioned previously herein, other interface devices can be employed to accept the driver commands. The input device 100 can also be implemented in the form of a rolling ball akin to the roller ball on older mouse devices.

Figure 4:
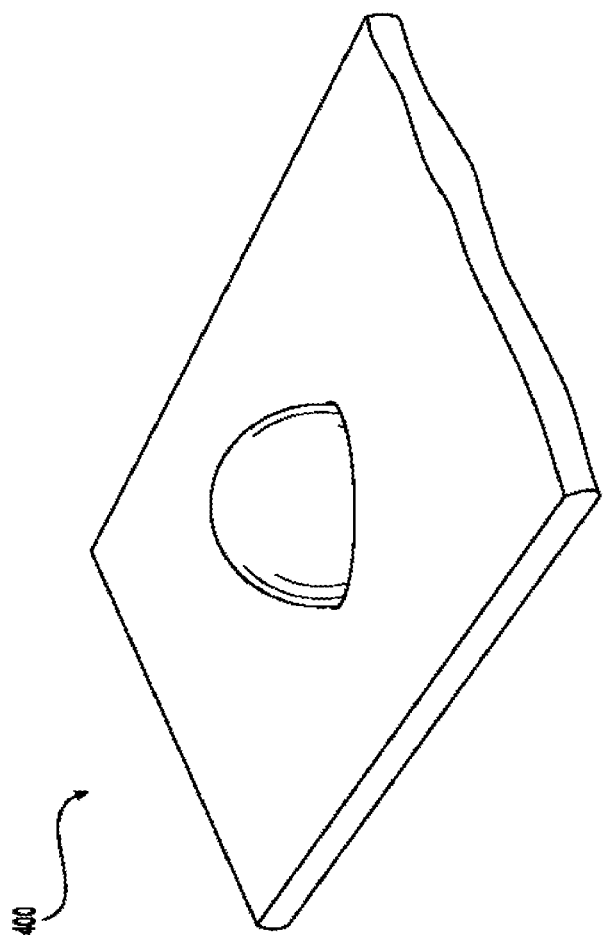
FIG. 4 is a schematic of a trackball input device according to one example.

FIG. 4 is a schematic of a trackball input device according to one example. The trackball input device 400 may also be used to provide input commands. For example, rolling the roller ball in a forward direction could be a command to accelerate forward. The speed of successive rolls may indicate the acceleration rate.

The tracking ball may be included on the bottom face of the input device, so that the ball rotates when the input device is moved along a flat surface disposed in the center console of the car. In one embodiment, the tracking ball is on the top face of the input device as shown in FIG. 4. The user rotates the ball with one or more fingers.

The input device detects the rolling movement of the ball and transfers it into signals that can be mapped to a command by the driver command controller 102. The driver command controller 102 detects the direction of the revolution of the ball, the length of rolling, and the speed. For example, the rate of acceleration/deceleration may be a function of the rolling speed of the ball.

Figure 5:
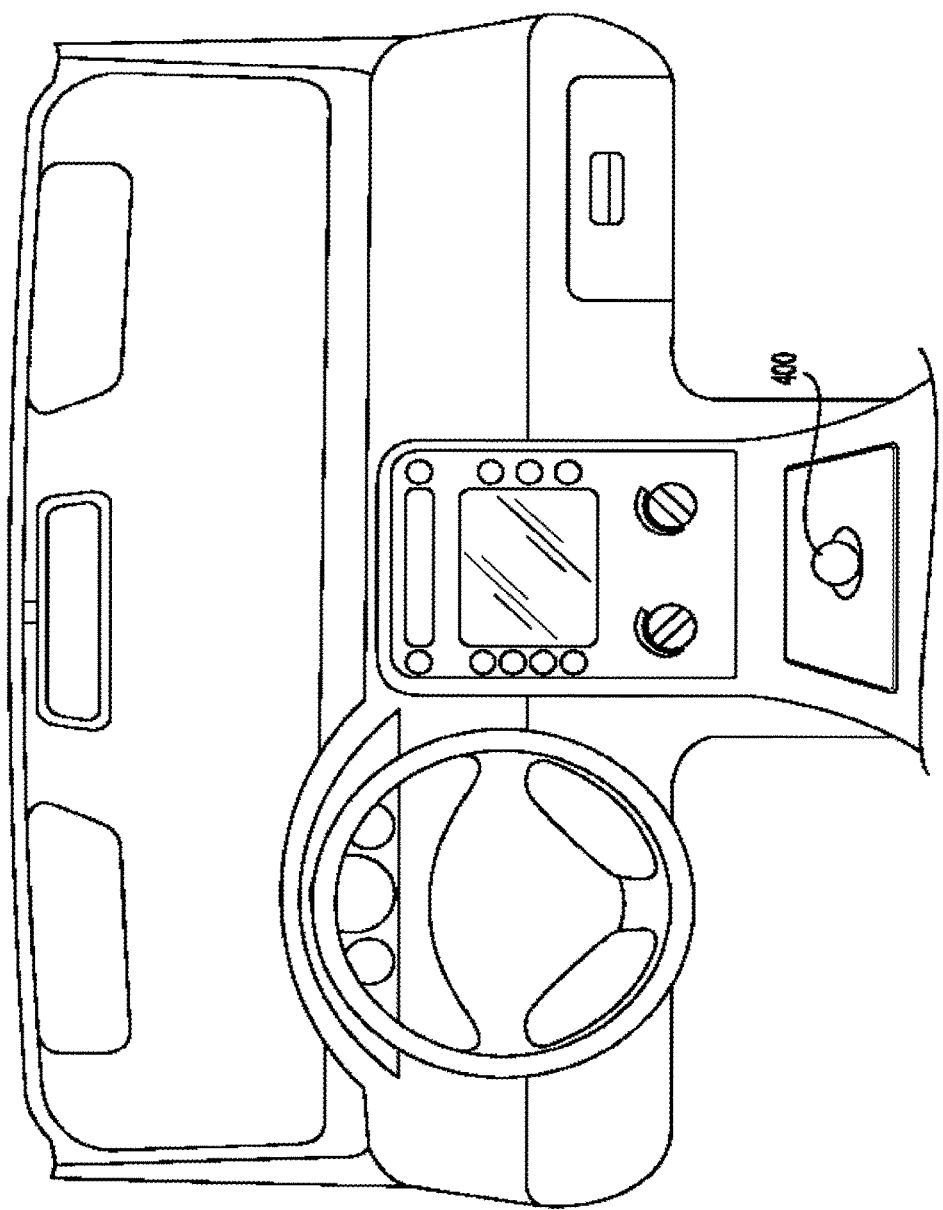
FIG. 5 is a schematic of the center console of the autonomous vehicle with the trackball input device according to one example.

FIG. 5 is a schematic of a center console of the vehicle with the trackball input device 400 according to one example. The position of the trackball 400 may be adjusted depending on the driver preference. That is, the trackball input device 400 may be adjusted in the x-y direction by the user.

Figure 6A:
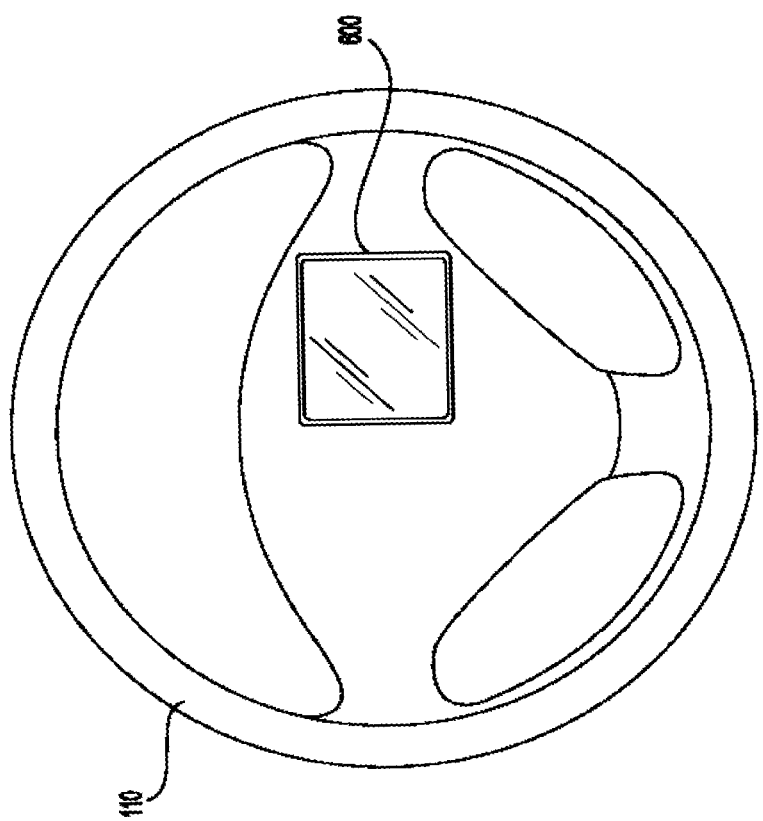
FIG. 6A is a schematic of a steering wheel with an input device according to one example.

FIG. 6A is a schematic that shows a front view of a steering wheel that includes a touch sensitive surface 600 mounted on the surface of the steering wheel 110 according to one example. The location of the touch sensitive surface 600 may be adjusted to a different location. For example, the location of the touch sensitive surface 600 may depend on the driver being left or right handed.

Figure 6B:
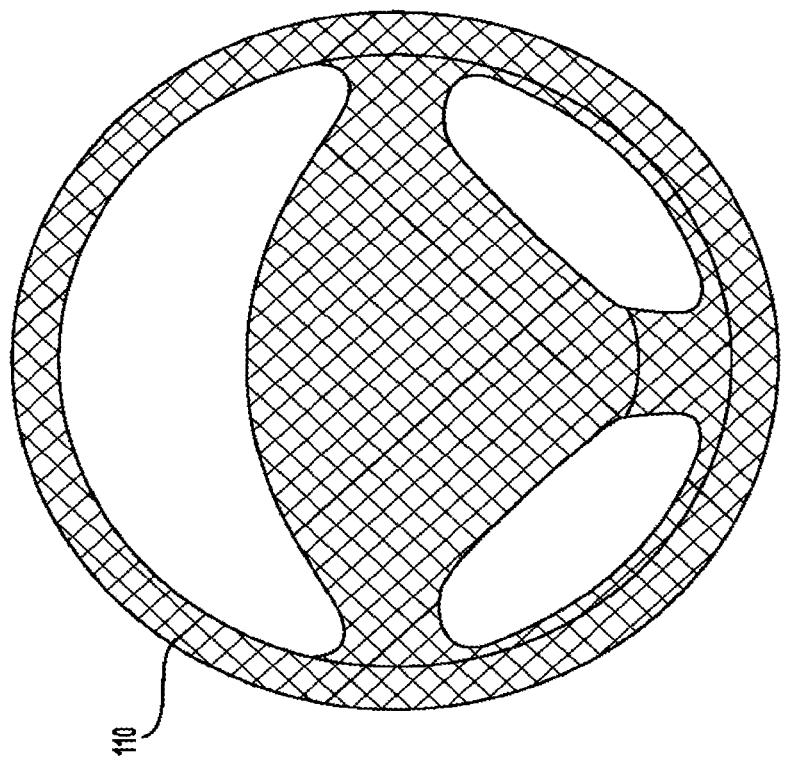
FIG. 6B is a schematic of a steering wheel with an input device according to one example.

FIG. 6B is a schematic that shows a front view of the steering wheel 110 according to one example. The touch sensitive surface 600 is overlaid over the steering wheel 110.

Figure 6C:
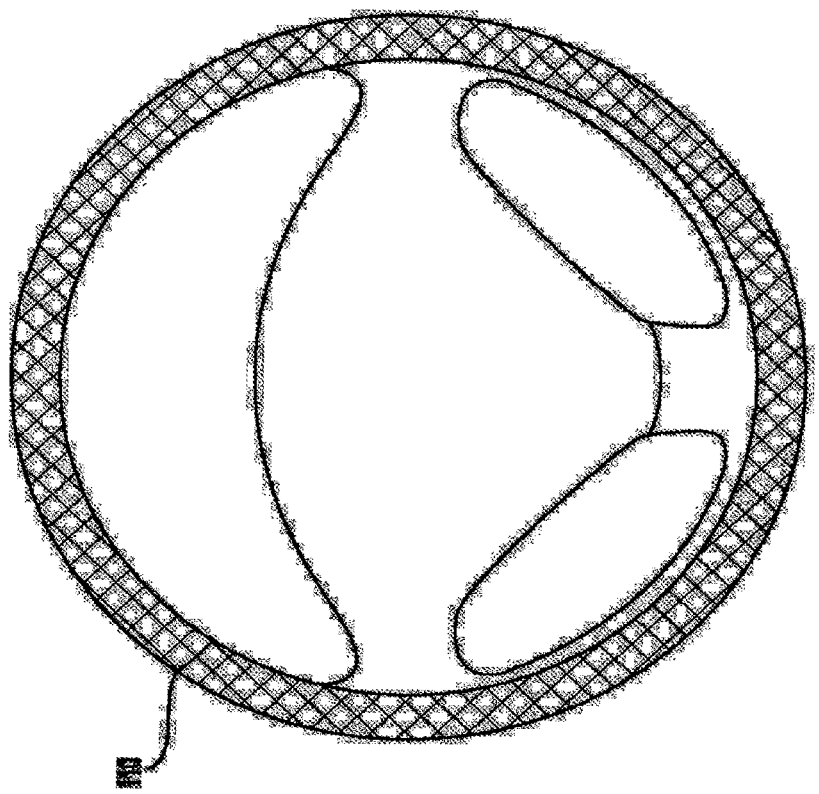
FIG. 6C is a schematic of a steering wheel with an input device according to one example.

FIG. 6C is a schematic that shows a front view of the steering wheel 110 according to one example. The touch sensitive surface 600 is overlaid over the handles of the steering wheel 110.

In one embodiment, a plurality of touch sensitive surfaces may be mounted on the surface of the steering wheel. For example, a first touch sensitive surface may be associated with the acceleration/deceleration function of the vehicle and a second touch sensitive surface may be associated with the steering of the vehicle such as small adjustments in a driving lane.

The steering wheel 110 may be multiple times smaller in construction than a standard steering wheel. The steering wheel may have an area on top of the steering wheel to allow for areas to swipe via a touchpad device for example.

In one embodiment, the vehicle may include one or more input devices. For example, the vehicle may include the touch sensitive surface 600 in addition to the touchpad input device 200.

Figure 7:
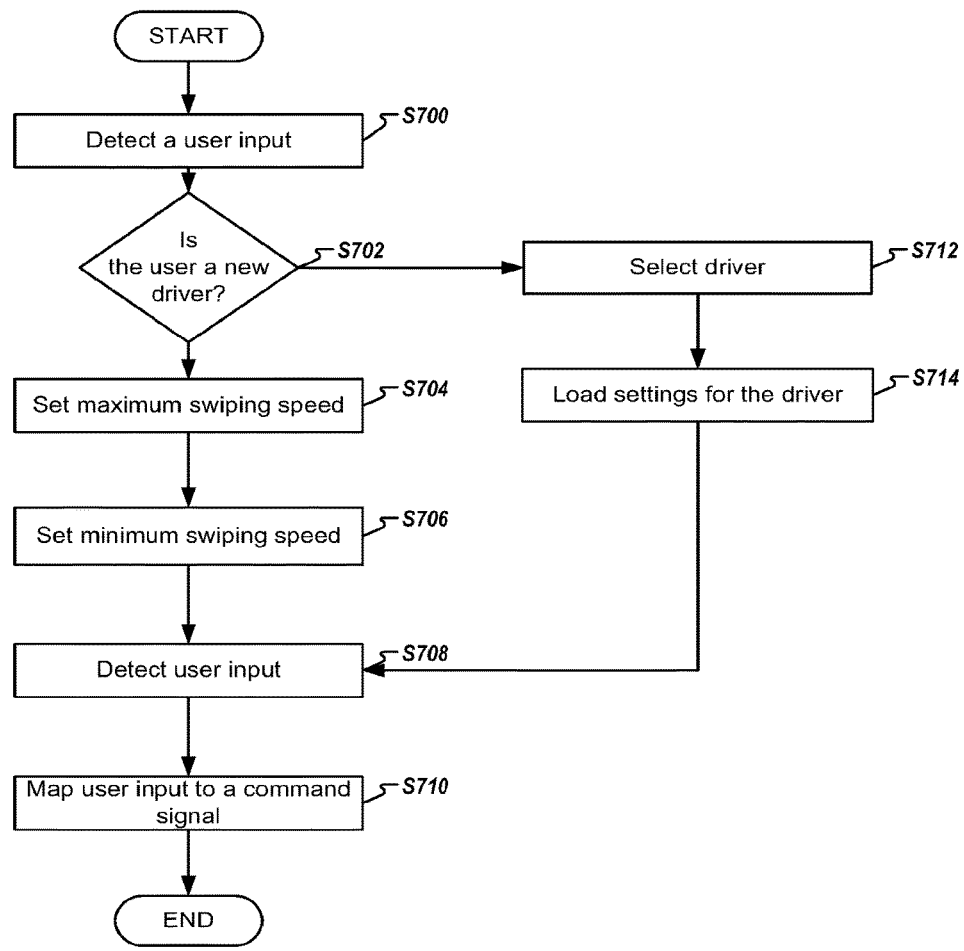
FIG. 7 is a flow chart that shows a method for controlling the autonomous vehicle according to one example.

FIG. 7 is a flow chart that shows a method for controlling the autonomous vehicle according to one example. At step S700, the driver command controller 102 may detect a user input. Then, the CPU 1000 may check to see whether the user is a new user at step S702. In one example, the CPU 1000 may determine whether the user is a new user by comparing a user identity with a list of past users stored in the memory 1002. The user identity may be determined in a plurality of methods such as voice recognition via a microphone or fingerprint recognition via a fingerprint sensor of the input device 100. The fingerprint is verified using fingerprint verification circuitry, included in the input device 100, by comparing the fingerprint with the fingerprint stored in the memory 1002. In one embodiment, the driver may use a username and optionally a password to login to the system. In one example, the user identity may be determined using an individual key fobs associated with each driver, a driver's cellphone linked to the vehicle's multimedia system by Bluetooth or other wireless methods, or image/facial recognition technology as would be understood by one of ordinary skill in the art. In response to determining that the user is a new user, the flow goes to step S704. In response to determining that the user is not a new user, the flow goes to step S712. At step S704, the user may be presented with an instruction to swipe with a maximum speed. The CPU 1000 detects a swiping speed of the user and associates the swiping speed with the user. The detected swiping speed corresponds to the user maximum swiping speed. The user maximum swiping speed corresponds to the maximum permissible change in acceleration.

At step S706, the CPU 1000 detects the minimum swiping speed of the user. The minimum swiping speed is associated with the user. For example, an instruction may be presented to the user to swipe with the lowest preferable swiping speed. As described previously herein, the minimum swiping speed indicates to the autonomous driving system 104 to decelerate with the maximum deceleration rate (e.g., 15 feet per second squared).

At step S708, the CPU 1000 detects a user input. The CPU 1000 may analyze the user input to determine whether the user input is a swiping motion. Then, the processing circuitry determines the speed of the swiping motion when the user input is a swiping motion. At step S710, the CPU 1000 maps the user input to a command signal. The user may slide one or more fingers to perform the swiping motion. In addition, the gesture may be performed using the user's palm.

At step S712, the user may select a driver from existing drivers. At step S714, the CPU 1000 may obtain the driver's setting from the memory 1002. Then, the flow goes to step S708.

Figure 8:
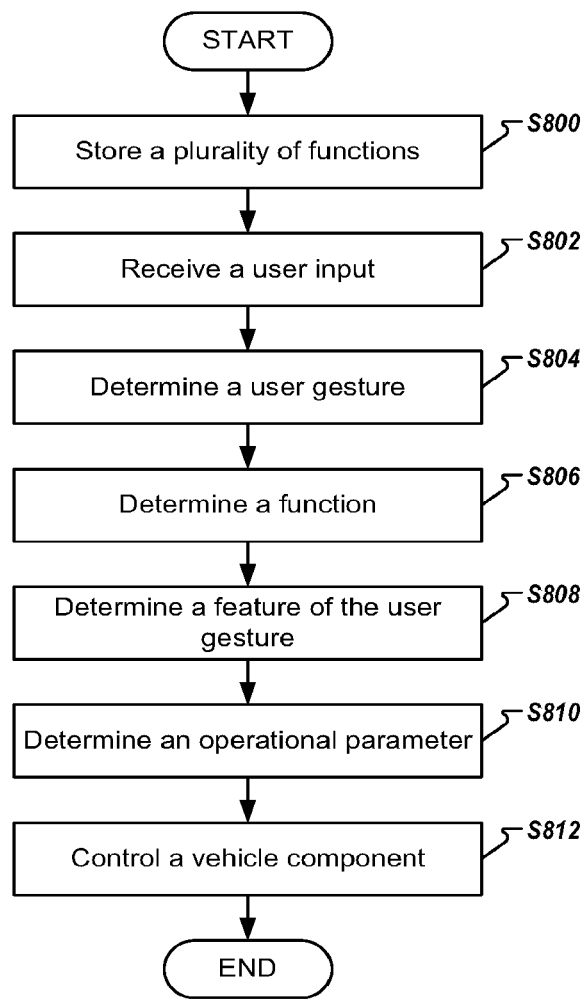
FIG. 8 is a flow chart that shows the operation of the system for controlling the autonomous vehicle according to one example.

FIG. 8 is a flow chart for that shows the operation of the system for controlling the autonomous vehicle according to one example. At step S800, a plurality of functions may be stored in the memory 1002. Each of the plurality of functions may be associated with a gesture. For example, a swipe gesture in a vertical direction may be associated with the acceleration/deceleration function of the vehicle. Then, at step S802, the CPU 1000 may detect a user input via the input device 100.

Then, at step S804, the CPU 1000 determines the user gesture based on the user input. For example, the CPU 1000 may determine whether the user input corresponds to a gesture stored in the memory 1002. In addition, the CPU 1000 may determine whether the gesture is valid. Each gesture may have one or more parameters associated with it. For example, a minimum contact time may be associated with the swipe gesture. That is, the CPU 1000 may compare the contact time for the user input with the minimum contact time to determine whether the gesture is valid. In one example, the gesture is valid when the CPU 1000 detects two or more fingers inputting the gesture. This has the advantage of not detecting involuntary gestures. In addition, the CPU 1000 may verify that the gesture is from an authorized driver. In one example, in response to determining that the gesture is valid, the system may output an alert (e.g., visual, haptic, sound) to the driver indicating that the gesture is accepted by the system.

At step S806, the CPU 1000 determines a function associated with the user gesture. For example, the CPU 1000 may use a lookup table to match the user gesture with a function of the vehicle (e.g., change in vehicle speed, lane change, left turn, right turn). At step S808, the CPU 1000 may determine a feature value associated with the user gesture. For example, the CPU 1000 may determine the swiping speed. At step S810, an operational parameter may be determined as a function of the feature. For example, the acceleration rate or the set speed is determined as a function of the feature. The CPU 1000 may use a look up table to match the feature value with an operational parameter. As described previously herein, the operational parameter may depend on the driver identity.

In addition, the features may be based on the identity of the driver. The identity of the driver may be determined by any one of the methods described herein or by any authenticating method as would be understood by one of ordinary skill in the art. That is, when the system detects that a particular driver is operating the vehicle, predefined settings may be loaded from the memory 1002 and used by the CPU 1000 to determine the function and associated operational parameters. In one example, the look up table may be downloaded by the CPU 1000 via a network. That is, when a driver drives multiple vehicles or purchases a new vehicle, the settings may be downloaded via the network. The user does not have to reconfigure the feature values.

At step S812, the CPU 1000 controls the vehicle component based on the operational parameter. For example, the CPU 1000 may send a control signal to the autonomous driving system 104.

FIG. 9A is a schematic of a vehicle front console according to one example. The vehicle may be equipped with the touchpad input device 200. The physical pedals 106 and the steering wheel 110 of the vehicle may be removed or hidden. In particular, the steering wheel may be built into the front console of the vehicle. The steering wheel is moved to the visible position only as needed by the driver. For example, the front console may include an enclosure and a mechanism to raise and lower the steering wheel as would be understood by one of ordinary skill in the art. The driver command controller 102 may send control signals to the steering wheel 110 and/or pedals 106 to change the position of the steering wheel and/or the pedals to a hidden position shown in FIG. 9B. In one embodiment, the steering wheel and/or the pedals are moved to the hidden position in response to detecting that the driver requests to operate the vehicle in an autonomous mode. In other examples, when the CPU 1000 detects a failure in the autonomous driving mode, the steering wheel and the physical pedals are moved to the visible position shown in FIG. 9A.

Next, a hardware description of the controller 102 according to exemplary embodiments is described with reference to FIG. 10. In FIG. 10, the controller 102 includes a CPU 1000 which performs the processes described herein. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 102 communicates, such as a server or computer.

Further, the claimed advancements may be provided as a utility application, background daemon, or component of an operating system, or combination thereof, executing in conjunction with CPU 1000 and an operating system such as Microsoft Windows, UNIX, Solaris, LINUX, Apple MAC-OS and other systems known to those skilled in the art.

Figure 11:
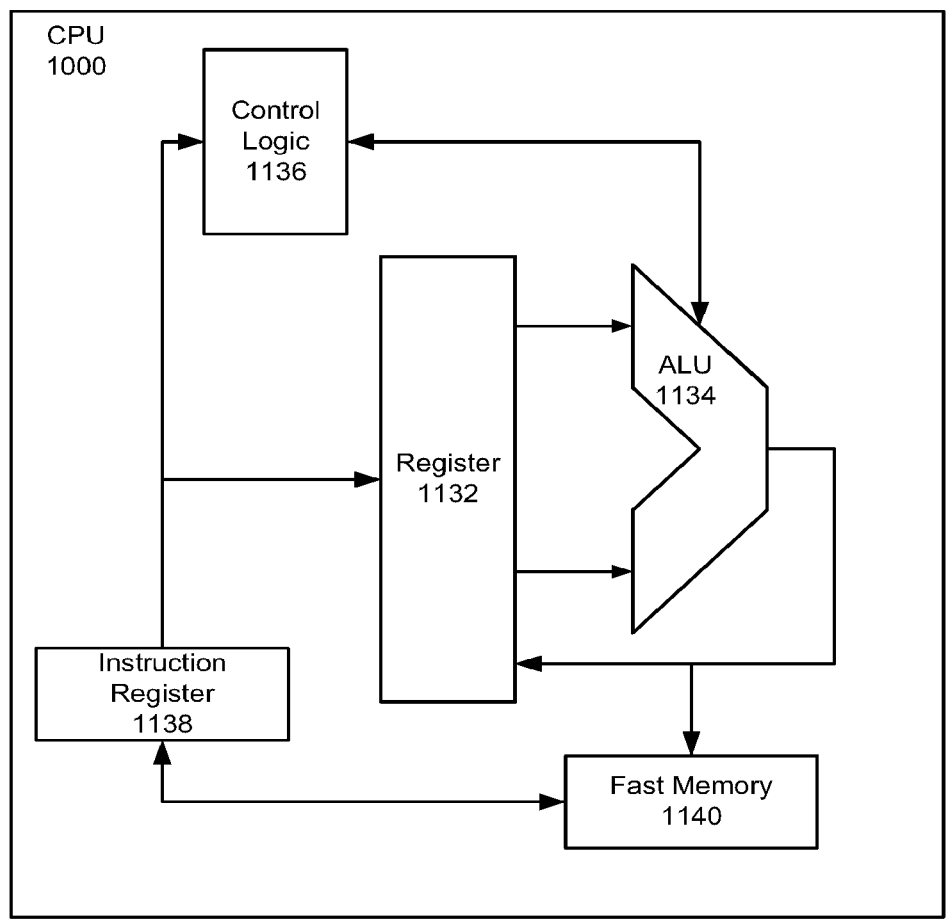
FIG. 11 is an exemplary block diagram of a central processing unit according to one example.

In order to achieve the controller 102, the hardware elements may be realized by various circuitry elements, known to those skilled in the art. For example, CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above. For example, FIG. 11 shows one implementation of CPU 1000.

The controller 102 in FIG. 10 also includes a network controller 1006, such as an Intel Ethernet PRO network interface card from Intel Corporation of America, for interfacing with network. As can be appreciated, the network can be a public network, such as the Internet, or a private network such as LAN or WAN network, or any combination thereof and can also include PSTN or ISDN sub-networks. The network can be wireless such as a cellular network including EDGE, 3G and 4G wireless cellular systems. The wireless network can also be WiFi, Bluetooth, or any other wireless form of communication that is known.

The controller 102 further includes a display controller 1008, such as a NVIDIA GeForce GTX, TEGRA, TITAN X, Quadro graphics adaptor from NVIDIA Corporation of America for interfacing with display 1010, or other graphics processing unit (GPU) as would be understood be one of ordinary skill in the art. The controller 102 may include a NVIDIA DRIVE PX 2 or DRIVE CX.

A general purpose I/O interface 1012 interfaces with a brake 1014 as well as a throttle 1016 and a steering wheel 110. General purpose I/O interface also connects to the input device 100.

The general purpose storage controller 1020 connects the storage medium disk 1004 with communication bus 1022, which may be an ISA, EISA, VESA, PCI, or similar, for interconnecting all of the components of the controller 102. A description of the general features and functionality of the display 1010, as well as the display controller 1008, storage controller 1020, network controller 1006, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in the circuitry on a single chipset.

In one implementation of CPU 1000, the instruction register 1138 retrieves instructions from the fast memory 1140. At least part of these instructions are fetched from the instruction register 1138 by the control logic 1136 and interpreted according to the instruction set architecture of the CPU 1000. Part of the instructions can also be directed to the register 1132. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1000 can use a reduced instruction set architecture, a complex instruction set architecture, a vector processor architecture, a very large instruction word architecture. Furthermore, the CPU 1000 can be based on the Von Neuman model or the Harvard model. The CPU 1000 can be a digital signal processor, an FPGA, an ASIC, a PLA, a PLD, or a CPLD. Further, the CPU 1000 can be an x86 processor by Intel or by AMD; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 10, or 11, constitutes or includes specialized corresponding structure that is programmed or configured to perform the algorithms shown in FIGS. 7 and 8.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method comprising:
   storing a plurality of functions associated with a plurality of touching gestures;
   receiving a user input;
   determining, using processing circuitry and based on the user input, a user gesture wherein the user gesture corresponds to one of the plurality of touching gestures;
   determining, using the processing circuitry, a function associated with the user gesture;
   determining, using the processing circuitry, a feature of the user gesture;
   determining, using the processing circuitry, an operational parameter of the function based on the feature; and
   controlling a vehicle component associated with the function as a function of the operational parameter, the vehicle component included in a vehicle that includes a steering wheel that moves between a first position in which the steering wheel is not visible to a passenger of the vehicle and a second position in which the steering wheel is visible to a passenger in the vehicle.

2. The method of claim 1, further comprising:
   determining a user identity; and
   determining the operational parameter based on the user identity and the user gesture.

3. The method of claim 1, wherein the feature of the user gesture is the speed of a user movement.

4. The method of claim 1, wherein
   the method further comprises moving the steering wheel to the first position in response to detecting the user is requesting to operate the vehicle in an autonomous driving mode via an input device.

5. The method of claim 1, further comprising:
   determining an extent of the gesture;
   comparing the extent with a predetermined duration; and
   controlling the vehicle component when the extent is higher than the predetermined duration.

6. The method of claim 1, wherein the user input is performed using one or more fingers.

7. The method of claim 1, wherein the user input is detected using a touch sensitive surface.

8. The method of claim 1, wherein the plurality of functions includes change in a vehicle speed, lane change, left turn, and right turn.

9. The method of claim 1, wherein the user gesture is a swiping movement.

10. The method of claim 9, wherein a change in a vehicle speed is a function of the speed of the swiping movement.

11. The method of claim 1, further comprising:
    generating a response signal from an autonomous system of a vehicle in response to detecting a valid user input.

12. A system comprising:
    a user interface; and
    processing circuitry configured to store a plurality of functions associated with a plurality of touching gestures, receive a user input via the user interface,
  determine, based on the user input, a user gesture wherein the user gesture corresponds to one of the plurality of touching gestures,
determine a function associated with the user gesture,
  determine a feature of the user gesture,
  determine an operational parameter of the function based on the feature, and
  control a vehicle component associated with the function as a function of the operational parameter, the vehicle component included in a vehicle that includes a steering wheel that moves between a first position in which the steering wheel is not visible to a passenger of the vehicle and a second position in which the steering wheel is visible to a passenger in the vehicle.

13. The system of claim 12, wherein the processing circuitry is further configured to:
  determine a user identity; and
  determine the operational parameter based on the user identity and the user gesture.

14. The system of claim 12, wherein the feature of the user gesture is the speed of a user movement.

15. The system of claim 12, wherein
  the processing circuitry is further configured to move the steering wheel to the first position in response to detecting the user requesting to operate the vehicle in an autonomous driving mode via an input device.

16. The system of claim 12, wherein the processing circuitry is further configured to:
  determine an extent of the gesture;
  compare the extent with a predetermined duration; and
  control the vehicle component when the extent is higher than the predetermined duration.

17. The system of claim 12, wherein the user input is performed using one or more fingers.

18. The system of claim 12, wherein the user input is detected using a touch sensitive surface.

19. The system of claim 12, wherein the plurality of functions includes change in a vehicle speed, lane change, left turn, and right turn.

20. A non-transitory computer readable medium storing computer-readable instructions therein which when executed by a computer cause the computer to perform a method comprising:
  storing a plurality of functions associated with a plurality of touching gestures;
  receiving a user input;
  determining, based on the user input, a user gesture wherein the user gesture corresponds to one of the plurality of touching gestures;
  determining a function associated with the user gesture;
  determining a feature of the user gesture;
  determining an operational parameter of the function based on the feature; and
  controlling a vehicle component associated with the function as a function of the operational parameter, the vehicle component included in a vehicle that includes a steering wheel that moves between a first position in which the steering wheel is not visible to a to a passenger of the vehicle and a second position in which the steering wheel is visible to a passenger in the vehicle.

21. The method of claim 4, further comprising:
  moving the steering wheel to the second position in response to detecting a failure in the autonomous driving mode.

22. The method of claim 1, wherein the vehicle includes pedals that move between a first position in which the pedals are not visible to the passenger in the vehicle and a second position in which the pedals are visible to the passenger in the vehicle.

* * * * *